United States Patent
Kitahara et al.

(10) Patent No.: US 8,293,373 B2
(45) Date of Patent: Oct. 23, 2012

(54) OXYGEN-ABSORBING RESIN COMPOSITION, OXYGEN-ABSORBING SHAPED ARTICLE, PACKAGING MATERIAL AND PACKAGING CONTAINER

(75) Inventors: Shizuo Kitahara, Saitama (JP); Jun Ishihara, Tokyo (JP)

(73) Assignee: Zeon Corporation, Tokyo (JP)

( * ) Notice: Subject to any disclaimer, the term of this patent is extended or adjusted under 35 U.S.C. 154(b) by 238 days.

(21) Appl. No.: 12/526,411

(22) PCT Filed: Feb. 15, 2008

(86) PCT No.: PCT/JP2008/052523
§ 371 (c)(1), (2), (4) Date: Sep. 23, 2009

(87) PCT Pub. No.: WO2008/102701
PCT Pub. Date: Aug. 28, 2008

(65) Prior Publication Data
US 2010/0126899 A1  May 27, 2010

(30) Foreign Application Priority Data
Feb. 20, 2007 (JP) ................................ 2007-039876

(51) Int. Cl.
*B29D 22/00* (2006.01)
*B32B 5/16* (2006.01)
*C08L 67/00* (2006.01)
*C08L 77/00* (2006.01)

(52) U.S. Cl. ................ 428/475.5; 428/474.4; 428/480; 525/165; 525/166; 525/175; 525/177; 525/178; 525/179; 525/184

(58) Field of Classification Search .................. 525/165, 525/166, 175, 177, 178, 179, 184; 428/474.4, 428/475.5, 480
See application file for complete search history.

(56) References Cited

FOREIGN PATENT DOCUMENTS

| JP | 2002-146217 A | 5/2002 |
|---|---|---|
| WO | WO-2005/053837 A1 | 6/2005 |
| WO | WO-2006/101021 A | 9/2006 |
| WO | WO-2007/049740 A1 | 5/2007 |
| WO | WO-2007/094247 A1 | 8/2007 |

OTHER PUBLICATIONS

International Search Report issued in International Application No. PCT/JP2008/052523.
International Preliminary Report on Patentability issued in International Application No. PCT/JP2008/052523.

*Primary Examiner* — Ana Woodward
(74) *Attorney, Agent, or Firm* — Birch, Stewart, Kolasch & Birch, LLP

(57) ABSTRACT

[PROBLEMS] To provide: an oxygen-absorbing resin composition which needs no transition metal compound, exhibits excellent oxygen absorbability at room temperature, produces little unpleasant odor during the absorption of oxygen, and enables to produce a molded article having excellent transparency; an oxygen-absorbing molded article comprising the oxygen-absorbing resin composition; and a packaging material and a packaging container each comprising the molded article. [MEANS FOR SOLVING PROBLEMS] Disclosed is an oxygen-absorbing resin composition comprising: a resin composition (A) which comprises an oxygen-absorbing resin (A1) having a cycloene structure in the molecule and a softening agent (A2) and has a glass transition temperature of −30 to +30° C.; and a resin (B) having an oxygen permeability of 100 to 500 cc 20 μm/m² day atm (25° C., 65% RH), wherein the resin composition (A) is dispersed in the resin (B). The softening agent (A2) is preferably liquid paraffin or polybutene. The resin (B) is preferably a (terephthalic acid)/(cyclohexanedimethanol) copolymer polyester or a polyamide resin.

15 Claims, No Drawings

OXYGEN-ABSORBING RESIN COMPOSITION, OXYGEN-ABSORBING SHAPED ARTICLE, PACKAGING MATERIAL AND PACKAGING CONTAINER

TECHNICAL FIELD

The present invention relates to an oxygen-absorbing resin composition for use for preventing the quality deterioration by oxygen of foods, drinks, drugs and the like, and more precisely, to an oxygen-absorbing resin composition that exhibits good oxygen absorbability even at room temperature and releases little smell on oxygen absorption, to an oxygen-absorbing shaped article produced by shaping the composition, which exhibits good oxygen absorbability even at room temperature and releases little smell on oxygen absorption and which has excellent transparency, and to a packaging material and a packaging container comprised of the shaped article.

BACKGROUND ART

The quality of foods, drinks, drugs and the like is deteriorated by oxygen, and therefore they are desired to be stored in the absence of oxygen or under the condition with an extremely small amount of oxygen.

Accordingly, containers or packages storing foods, drinks, drugs or the like are often purged with nitrogen. However, the method is problematic in that, for example, the production cost may increase and, when they are once opened, air may flow into them from the outside and thereafter the quality deterioration could be no more prevented. Therefore, various investigations have been made for absorbing oxygen remaining in containers and packages and moving oxygen from them.

Recently, for resin containers or packaging materials, there has been mainly employed a method of making a resin container or a packaging material itself have oxygen absorbability.

As an oxygen absorbent for producing such oxygen-absorbing containers, for example, there is proposed an oxygen absorbent that comprises a polyterpene such as poly(α-pinene), poly(β-pinene) or poly(dipentene) (Patent reference 1), a conjugated diene polymer such as polyisoprene or 1,2-polybutadiene (Patent Reference 2), a copolymer of ethylene and cyclopentene (Patent Reference 3), a styrene-diene copolymer and/or a hydrogenated styrene-diene copolymer (Patent Reference 4) or the like, and a transition metal salt serving as an oxygen absorption catalyst such as cobalt neodecanoate or cobalt oleate.

However, these conventional oxygen absorbents are often difficult to use in some applications since the polymer may be deteriorated with the advance of oxygen absorption reaction and their mechanical strength may significantly lower or the transition metal compound such as a transition metal salt may bleed out.

Patent Reference 1: JP-T 2001-507045
Patent Reference 2: JP-A 2003-71992
Patent Reference 3: JP-T 2003-504042
Patent Reference 4: JP-A 2005-15055

The present inventors have noted a cyclized product of a conjugated diene polymer as an oxygen absorbent free from the above-mentioned problems, and have made studies of its application. Differing from the above-mentioned conventional oxygen absorbents, a cyclized product of a conjugated diene polymer has the advantage of exhibiting its excellent oxygen absorbability even in the absence of a catalyst metal compound.

The inventors have found an oxygen-absorbing resin composition that comprises an oxygen-absorbing resin (A1) having a cycloene structure in the molecule and a softener (A2) and has a glass transition temperature of not higher than 30° C., as an improvement on the cyclized product of a conjugated diene polymer in point of the oxygen absorbability at room temperature (Japanese Patent Application No. 2006-039044).

However, it could not be said that there may be no further room for improving the oxygen-absorbing resin composition in point of the level of bad smell to be released on oxygen absorption.

DISCLOSURE OF THE INVENTION

Problems that the Invention is to Solve

Accordingly, an object of the present invention is to provide an oxygen-absorbing resin composition which does not require incorporating a transition metal compound thereinto, which has excellent oxygen absorbability at room temperature, which releases little smell on oxygen absorption, and which can produce a shaped article having excellent transparency.

Another object of the invention is to provide an oxygen-absorbing shaped article produced by shaping the above-mentioned, oxygen-absorbing resin composition.

Still another object of the invention is to provide an oxygen-absorbing shaped article having a layer formed of the oxygen-absorbing resin composition, and an oxygen-absorbing packaging material and packaging container comprised of the shaped article.

Means for Solving the Problems

The present inventors have further made assiduous studies of the above-mentioned, oxygen-absorbing resin composition that comprises an oxygen-absorbing resin (A1) having a cycloene structure in the molecule and a softener (A2) for the purpose of reducing the bad smell to be released by the composition in its reaction for oxygen absorption and, as a result, have found that a resin composition produced by dispersing the oxygen-absorbing resin composition in a matrix of a specific resin not only enables the above-mentioned smell-release reduction but also makes it possible to produce a shaped article having excellent transparency, and have completed the present invention.

According to the invention, there is provided an oxygen-absorbing resin composition comprising a resin composition (A) that comprises an oxygen-absorbing resin (A1) having a cycloene structure in the molecule and a softener (A2) and has a glass transition temperature of from −30° C. to +30° C., as dispersed in a resin (B) having an oxygen permeability of from 100 cc to 500 cc 20 μm/m$^2$·day·atm (25° C., 65% RH).

In the oxygen-absorbing resin composition of the invention, the oxygen-absorbing resin (A1) is preferably a cyclized product of a conjugated diene polymer having an unsaturated bond reduction ratio of from 60% to 80%.

In the oxygen-absorbing resin composition of the invention, the softener (A2) is preferably liquid paraffin or polybutene.

In the oxygen-absorbing resin composition of the invention, the resin (B) is preferably a terephthalic acid/cyclohexanedimethanol-based copolymer polyester or a polyamide resin.

According to the invention, there is also provided an oxygen-absorbing shaped article produced by shaping the above-mentioned, oxygen-absorbing resin composition of the invention.

The oxygen-absorbing shaped article of the invention may have a form of film.

According to the invention, there is also provided an oxygen-absorbing shaped article having a layer formed of the above-mentioned, oxygen-absorbing resin composition of the invention.

The oxygen-absorbing shaped article of the invention may have a form of multilayer film.

According to the invention, there is also provided an oxygen-absorbing packaging material comprised of the above-mentioned, oxygen-absorbing shaped article of the invention.

According to the invention, there is also provided an oxygen-absorbing packaging container comprised of the above-mentioned, oxygen-absorbing packaging material of the invention.

ADVANTAGES OF THE INVENTION

The oxygen-absorbing resin composition of the invention does not require use of a transition metal, exhibits excellent oxygen absorbability at room temperature, and releases little smell on oxygen absorption.

The oxygen-absorbing shaped article produced by shaping the oxygen-absorbing resin composition of the invention exhibits excellent oxygen absorbability at room temperature and releases little smell on oxygen absorption, and has excellent transparency.

Further, the oxygen-absorbing shaped article of the invention, does not indispensably require use of a transition metal, and is therefore highly safe with no problem in metal detection and in use in microwave ovens and the like. Accordingly, the oxygen-absorbing shaped article of the invention is favorable for a packaging material for various foods, chemicals, drugs, cosmetics, etc.

BEST MODES FOR CARRYING OUT THE INVENTION

The oxygen-absorbing resin composition of the invention comprises, as the indispensable ingredient thereof, a resin composition (A) that comprises an oxygen-absorbing resin (A1) having a cycloene structure in the molecule and a softener (A2) and has a glass transition temperature of from −30° C. to +30° C.

The oxygen-absorbing resin (A1) having a cycloene structure in the molecule for use in the invention is not specifically limited, provided that it is an oxygen-absorbing resin having a cyclic structure in the molecule and having at least one double bond in the cyclic structure.

Its specific examples include a cyclized product of a conjugated diene polymer, a conjugated diene-aromatic vinyl compound copolymer, a ring-opening polymer and an addition polymer of an alicyclic compound, a terpene resin, and their partial hydrogenates.

Also usable are a cyclohexenylmethyl acrylate copolymer, a polyester of 1,2,3,6-tetrahydrophthalic acid or its anhydride with a glycol, and a polyester of tetrahydrophthalic acid except the above or its anhydride with a glycol.

Of those oxygen-absorbing resins having a cycloene structure in the molecule, preferred is a cyclized product of a conjugated diene polymer.

The cyclized product of a conjugated diene polymer is obtained through cyclization of a conjugated diene polymer in the presence of an acid catalyst.

The conjugated diene polymer for use herein includes a homopolymer and a copolymer of conjugated diene monomer(s), and a copolymer of a conjugated diene monomer with a monomer copolymerizable therewith.

The conjugated diene monomer is not particularly limited, and examples thereof include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, etc.

One or more of these monomers may be used either singly or as combined.

The other monomer copolymerizable with the conjugated diene monomer includes, for example, aromatic vinyl monomers such as styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2,4-dibromostyrene and vinylnaphthalene; linear olefin monomers such as ethylene, propylene and 1-butene; cyclic olefin monomers such as cyclopentene and 2-norbornene; non-conjugated diene monomers such as 1,5-hexadiene, 1,6-heptadiene, 1,7-octadiene, dicyclopentadiene and 5-ethylidene-2-norbornene; (meth)acrylates such as methyl (meth)acrylate and ethyl(meth)acrylate; other (meth)acrylic acid derivatives such as (meth)acrylonitrile and (meth)acrylamide; etc.

One or more of these monomers may be used either singly or as combined.

Specific examples of the conjugated diene polymer include natural rubber (NR), styrene-isoprene rubber (SIR), styrene-butadiene rubber (SBR), polyisoprene rubber (IR), polybutadiene rubber (BR), isoprene-isobutylene copolymer rubber (IIR), ethylene-propylene-diene copolymer rubber (EPDM), butadiene-isoprene copolymer rubber (BIR), styrene-isoprene block polymer, styrene-butadiene block polymer, etc. Above all, preferred are polyisoprene rubber, polybutadiene rubber and styrene-isoprene block polymer; and more preferred are polyisoprene rubber and styrene-isoprene block polymer. One or more of these conjugated diene polymers may be used either singly or as combined.

The content of the conjugated diene monomer unit in the conjugated diene polymer may be suitably selected within a range not detracting from the advantages of the invention, but in general, it may be at least 40 mol %, preferably at least 60 mol %, more preferably at least 80 mol %. When the content of the conjugated diene monomer unit is too small, then the unsaturated bond reduction ratio falling within a suitable range to be mentioned hereinunder may be difficult to obtain.

The conjugated diene polymer may be prepared in an ordinary polymerization method, and for example, it may be prepared through solution polymerization or emulsion polymerization using a suitable catalyst such as a Ziegler polymerization catalyst containing titanium or the like as the catalyst component, or an alkyllithium polymerization catalyst or a radical polymerization catalyst.

The cyclized product of a conjugated diene polymer to be used in the invention may be prepared through cyclization of the above-mentioned, conjugated diene polymer in the presence of an acid catalyst.

The acid catalyst for use in the cyclization may be any known one. Its specific examples include sulfuric acid; organic sulfonic acid compounds such as fluoromethanesulfonic acid, difluoromethanesulfonic acid, p-toluenesulfonic acid, xylenesulfonic acid, alkylbenzenesulfonic acids having an alkyl group with from 2 to 18 carbon atoms, and anhydrides and alkyl esters thereof; Lewis acids such as boron trifluoride, boron trichloride, tin tetrachloride, titanium tetrachloride, aluminum chloride, diethylaluminum monochloride, ethylammonium chloride, aluminum bromide, antimony pentachloride, tungsten hexachloride and iron chloride; etc. One or more of these acid catalysts may be used either singly or as combined. Of the above-mentioned acid catalysts, preferred are organic sulfonic acid compounds; and more preferred are p-toluenesulfonic acid and xylenesulfonic acid.

The amount of the acid catalyst to be used may be generally from 0.05 to 10 parts by weight per 100 parts by weight of the conjugated diene polymer, preferably from 0.1 to 5 parts by weight, more preferably from 0.3 to 2 parts by weight.

In general, the conjugated diene polymer is dissolved in a hydrocarbon solvent for its cyclization.

The hydrocarbon solvent is not particularly limited, provided that it does not interfere with the cyclization. It includes, for example, aromatic hydrocarbons such as benzene, toluene, xylene and ethylbenzene; aliphatic hydrocarbons such as n-pentane, n-hexane, n-heptane and n-octane; alicyclic hydrocarbons such as cyclopentane and cyclohexane; etc. Preferably, the boiling point of those hydrocarbon solvents is not lower than 70° C.

The solvent for the polymerization to give the conjugated diene polymer and the solvent for the cyclization may be the same type. In this case, an acid catalyst for cyclization may be added to the polymerization reaction liquid after polymerization, whereby the cyclization may be attained subsequently after the polymerization.

The amount of the hydrocarbon solvent to be used may be such that the solid concentration of the conjugated diene polymer therein could be generally from 5 to 60% by weight, preferably from 20 to 40% by weight.

The cyclization may be attained under increased pressure or under reduced pressure, or under atmospheric pressure, but from the viewpoint of the simplicity in operation, it is preferably attained under atmospheric pressure. The cyclization in a dry stream, especially in an atmosphere of dry nitrogen or dry argon may prevent side reaction to be caused by moisture.

The reaction temperature and the reaction time in the cyclization are not specifically defined. The reaction temperature may be generally from 50 to 150° C., preferably from 70 to 110° C.; and the reaction time may be generally from 0.5 to 10 hours, preferably from 2 to 5 hours.

After the cyclization reaction, the acid catalyst is inactivated in an ordinary manner, then the acid catalyst residue is removed, and thereafter the hydrocarbon solvent is removed, thereby giving a solid cyclized product of a conjugated diene polymer.

In the invention, especially preferred is use of a cyclized product of a conjugated diene polymer having an unsaturated bond reduction ratio of from 60% to 80%.

Using a cyclized product of a conjugated diene polymer having an unsaturated bond reduction ratio of at least 60% makes it possible to prevent smell release on oxygen absorption.

The unsaturated bond reduction ratio of the cyclized product of a conjugated diene polymer is preferably from 60 to 75%. The unsaturated bond reduction ratio of the cyclized product of a conjugated diene polymer may be controlled by suitably selecting the amount of the acid catalyst, the reaction temperature and the reaction time in cyclization.

Suitably defining the unsaturated bond reduction ratio of the cyclized product of a conjugated diene polymer enables the resin composition to have a glass transition temperature falling within a suitable range, therefore resulting in that the resin composition may exhibit excellent oxygen absorbability and may prevent smell release on oxygen absorption. When the unsaturated bond reduction ratio is too low, then the quantity of smell release on oxygen absorption may increase; and a cyclized product of a conjugated diene polymer having a too large unsaturated bond reduction ratio may be difficult to produce, and only a brittle one could be obtained.

The unsaturated bond reduction ratio as referred to herein is an index that indicates the degree of unsaturated bond reduction through cyclization in the conjugated diene monomer unit segment in the conjugated diene polymer; and its value is determined in the manner mentioned below. Specifically, in the conjugated diene monomer unit segment in a conjugated diene polymer, the ratio of the peak area of the protons directly bonding to the double bond to the peak area of all protons is determined through proton NMR analysis before and after cyclization, and the reduction ratio is computed from the data.

In the conjugated diene monomer unit segment in a conjugated diene polymer, when the overall proton peak area before cyclization is represented by SBT and the peak area of the protons directly bonding to the double bond before cyclization is represented by SBU, the overall proton peak area after cyclization is represented by SAT and the peak area of the protons directly bonding after cyclization to the double bond is represented by SAU, then the peak area ratio (SB) of the protons directly bonding to the double bond before cyclization is:

$$SB=SBU/SBT,$$

and the peak area ratio (SA) of the protons directly bonding to the double bond after cyclization is:

$$SA=SAU/SAT.$$

Accordingly, the unsaturated bond reduction ratio is determined according to the following equation:

$$\text{Unsaturated bond reduction ratio}(\%)=100\times(SB-SA)/SB.$$

The weight-average molecular weight of the cyclized product of a conjugated diene polymer may be generally from 1,000 to 1,000,000, in terms of standard polystyrene measured through gel permeation chromatography, preferably from 10,000 to 700,000, more preferably from 30,000 to 500,000. The weight-average molecular weight of the cyclized product of a conjugated diene polymer may be controlled by suitably selecting the weight-average molecular weight of the conjugated diene polymer to be cyclized.

Suitable definition of the weight-average molecular weight of the cyclized product of a conjugated diene polymer enhances the film shapability of the oxygen-absorbing resin composition and the mechanical strength thereof. In addition, the solution viscosity in cyclization may be appropriate and the processability in extrusion of the oxygen-absorbing resin composition may be kept good.

The gel (toluene-insoluble) fraction of the cyclized product of a conjugated diene polymer may be generally at most 10% by weight, preferably at most 5% by weight, but more preferably the cyclized product contains substantially no gel. When the gel fraction is too much, then the film obtained from the oxygen-absorbing resin composition may lose smoothness.

In the invention, an antioxidant, if any, in the cyclized product of a conjugated diene polymer may detract from the oxygen absorbability of the cyclized product of a conjugated diene polymer, and preferably, therefore, the cyclized product of a conjugated diene polymer does not substantially contain an antioxidant. However, for securing the stability in processing the cyclized product of a conjugated diene polymer and for controlling the oxygen absorbability thereof, an antioxidant may be added to the cyclized product in an amount of at most 8,000 ppm, preferably from 30 ppm to 5,000 ppm, more preferably from 50 ppm to 3,000 ppm.

The antioxidant is not particularly limited and may be any one generally used in the field of resin materials or rubber materials. Typical examples of the antioxidant include hindered phenolic antioxidants, phosphorus-containing antioxidants and lactone-based antioxidants. Two or more types of such antioxidants may be used as combined.

Specific examples of the hindered phenolic antioxidants are 2,6-di-t-butyl-p-cresol, pentaerythritol tetrakis[3-(3,5-di-t-butyl-4-hydroxyphenyl)propionate], thiodiethylenebis[3-(3,5-di-t-butyl-4-hydroxyphenyl)propionate], octadecyl 3-(3,5-di-t-butyl-4-hydroxyphenyl)propionate, N,N'-hexane-1,6-diylbis[3-(3,5-di-t-butyl-4-hydroxyphenyl)propionamide], diethyl[[3,5-bis(1,1-dimethylethyl)-4-hydroxyphenyl]methyl]phosphonate, 3,3',3'',5,5',5''-hexa-t-butyl-a,a',a''-(mesitylene-2,4,6-triyl)tri-p-cresol, hexamethylenebis [3-(3,5-di-t-butyl)-4-hydroxyphenyl]propionate, tetrakis [methylene-3-(3,5-di-t-butyl-4-hydroxyphenyl)propionate] methane, n-octadecyl-3-(4'-hydroxy-3,5'-di-t-butylphenyl) propionate, 1,3,5-tris(3,5-di-t-butyl-4-hydroxybenzyl)-1,3, 5-triazine-2,4,6(1H,3H,5H)-trione, 2,4-bis(n-octylthio)-6-(4-hydroxy-3,5-di-t-butylanilino)-1,3,5-triazine, tris(3,5-di-t-butyl-4-hydroxybenzyl)isocyanurate, 2-t-butyl-6-(3-t-butyl-2-hydroxy-5-methylbenzyl)-4-methylphenyl acrylate, 2-[1-(2-hydroxy-3,5-di-t-phenylbutyl)ethyl]-4,6-di-t-pentylphenyl acrylate, etc.

Specific examples of the phosphorus-containing antioxidants include tris(2,4-di-t-butylphenyl)phosphite, bis[2,4-bis (1,1-dimethylethyl)-6-methylphenyl]ethyl phosphite, tetrakis(2,4-di-t-butylphenyl)[1,1-biphenyl]-4,4'-diyl bisphosphonite, bis(2,4-di-t-butylphenyl)pentaerythritol phosphite, 4,4'-butylidenebis(3-methyl-6-t-butylphenyl-ditridecyl phosphite), etc.

A reaction product of 5,7-di-t-butyl-3-(3,4-dimethylphenyl)-3H-benzofuran-2-one or the like with o-xylene, which is a lactone-based antioxidant, may also be used, as combined with the above.

In addition, if desired, various compounds generally added to the cyclized product of a conjugated diene polymer may be added. The compounds include a filler such as calcium carbonate, alumina and titanium oxide; a tackifier (hydrogenated petroleum resins, hydrogenated terpene resins, castor oil derivatives, sorbitan higher fatty acid esters); a plasticizer (phthalates, glycol esters); a surfactant; a leveling agent; a UV absorbent; a light stabilizer; an aldehyde adsorbent such as alkylamines and amino acids; a dehydrating agent; a pot life extender (acetylacetone, methanol, methyl orthoacetate, etc.); a cissing-improving agent; etc.

The softener (A2) for use in the invention as the indispensable ingredient of the resin composition (A) must be capable of making the oxygen-absorbing resin composition (A), which comprises the oxygen-absorbing resin (A1) having a cycloene structure in the molecule and the softener (A2), have a glass transition temperature of from −30° C. to +30° C.

The softener (A2) is not particularly limited so far as it satisfies the above-mentioned requirement, but in general, it is compatible with the oxygen-absorbing resin (A1) having a cycloene structure in the molecule, and is preferably a fluid having by itself a glass transition temperature or a pour point of from −150° C. to −30° C.

Specific examples of the softener (A2) include hydrocarbon oils such as isoparaffin-based oil, naphthene-based oil and liquid paraffin; olefin polymers such as polybutene; hydrogenated products of conjugated diene polymers such as polyisoprene and polybutadiene; hydrogenated products of styrene-conjugated diene polymers, etc.

For the softener (A2), one or more types of the above may be used either singly or as combined.

Of those, preferred are hydrocarbon oils and olefin polymers; and more preferred are liquid paraffin and polybutene.

In the oxygen-absorbing resin composition of the invention, the ratio of the oxygen-absorbing resin (A1) having a cycloene structure in the molecule to the softener (A2) may depend on the glass transition temperature of the oxygen-absorbing resin having the cycloene structure therein but is not particularly limited so far as the glass transition temperature of the resin composition (A) could be from −30° C. to +30° C.

For example, when a cyclized polyisoprene having an unsaturated bond reduction ratio of 68% is used as the oxygen-absorbing resin having a cycloene structure in the molecule and when liquid paraffin is used as the softener (A2), then the weight of the liquid paraffin is preferably within a range of from 10 to 50% of the total weight of the oxygen-absorbing resin (A1) having a cycloene structure in the molecule and the liquid paraffin.

The blend ratio of the softener (A2) is preferably within a range of from 10 to 50% by weight relative to the total of the oxygen-absorbing resin (A1) and the softener (A2), more preferably from 15 to 25% by weight.

When the ratio by weight of the oxygen-absorbing resin (A1) to the softener (A2) falls within the above range, then the oxygen absorbability of the obtained oxygen-absorbing resin composition may be good.

In the oxygen-absorbing resin composition of the invention, the resin composition (A) that comprises the oxygen-absorbing resin (A1) having a cycloene structure in the molecule and the softener (A2) and has a glass transition temperature of from −30° C. to +30° C. must be dispersed in a resin (B) having an oxygen permeability of from 100 cc to 500 cc 20 μm/m$^2$·day·atm (25° C., 65% RH). The expression "from 100 cc to 500 cc 20 μm/m$^2$·day·atm" means that a gas (oxygen) having a differential pressure of 1 atm permeates through a film of the oxygen-absorbing resin composition having a thickness of 20 μm, in an amount of from 100 to 500 cc a day per 1 m$^2$ of the film.

Specific examples of the resin (B) having an oxygen permeability of from 100 cc to 500 cc 20 μm/m$^2$·day·atm (25° C., 65% RH) include terephthalic acid/cyclohexanedimethanol copolymer polyesters (so-called PET-G), polyamide resins, etc.

The terephthalic acid/cyclohexanedimethanol copolymer polyester is a polyester that comprises a dicarboxylic acid ingredient mainly composed of terephthalic acid and a glycol ingredient comprising from 5 to 95 mol % of 1,4-cyclohexanedimethanol and from 95 to 5 mol % of ethylene glycol.

The polyamide resin includes, for example, polycondensed nylons such as nylon 6, nylon 11 and nylon 12; co-polycondensed nylons such as nylon 66, nylon 610 and nylon 612; copolymers of a polycondensed nylon and a co-polycondensed nylon; etc.

When the resin (B) has an oxygen permeability of less than 100 cc 20 μm/m$^2$·day·atm (25° C., 65% RH), it is unfavorable since its oxygen-absorbing rate at room temperature is low. On the other hand, a resin having an oxygen permeability of more than 500 cc 20 μm/m$^2$·day·atm (25° C., 65% RH) is also unfavorable since it may release much smell on oxygen absorption though its oxygen-absorbing rate is not low.

Also preferably, the melt index (MI) of the resin (B) and the melt index of the resin composition (A) that contains the oxygen-absorbing resin (A1) having a cycloene structure in the molecule and the softener (A2), as measured at 230° C. and under a load of 2.16 kgf/mm$^2$, satisfy a relationship of 0.005<MI of resin (B)/MI of resin composition (A)<10, more preferably 0.05<MI of resin (B)/MI of resin composition (A)<3.

In the oxygen-absorbing resin composition of the invention, the ratio of the resin composition (A) that comprises the oxygen-absorbing resin (A1) having a cycloene structure in the molecule and the softener (A2) and has a glass transition temperature of from −30° C. to +30° C., to the resin (B) falls, in terms of the weight ratio of the resin composition (A) to the resin (B) ((A)/(B)), generally from 50/50 to 10/90, preferably from 45/55 to 20/80.

When the ratio of the resin composition (A) is too high, then the oxygen absorption by the resin mixture may be high but the smell from the resin mixture may increase; and on the contrary, when the ratio of the resin composition (A) is too low, then the smell may be small but the oxygen absorption may be low.

The oxygen-absorbing resin composition of the invention may contain any other known oxygen-absorbing ingredient than the oxygen-absorbing resin (A1) having a cycloene structure in the molecule so far as it does not detract from the advantages of the invention. The amount of the other oxygen-absorbing ingredient than the oxygen-absorbing resin (A1) having a cycloene structure in the molecule may be less than 50% by weight to the total amount of the oxygen-absorbing ingredients (total amount of the oxygen-absorbing resin (A1) having a cycloene structure in the molecule and the other oxygen-absorbing ingredient), preferably less than 40% by weight, more preferably less than 30% by weight.

The oxygen-absorbing resin composition of the invention exhibits excellent performance in the absence of a transition metal compound, and therefore, preferably, it does not contain a transition metal compound that may have some negative influence such as polymer degradation.

The oxygen-absorbing resin composition of the invention has an oxygen absorption rate at 25° C. of preferably at least 0.2 cc/100 cm$^2$·day, more preferably at least 1.0 cc/100 cm$^2$·day. The oxygen absorption rate depends on the surface area of the oxygen-absorbing resin composition kept in contact with oxygen.

The method for preparing the oxygen-absorbing resin composition of the invention is not particularly limited, for which, for example, the oxygen-absorbing resin (A1) having a cycloene structure in the molecule, the softener (A2), the resin (B) and, optionally, other resin and various additives may be mixed in any desired method.

The order of mixing them is not particularly limited. The ingredients may be mixed all at a time, or some of them are previously mixed and the remaining ingredient(s) may be mixed with the resultant mixture. Preferably, the oxygen-absorbing resin (A1) having a cycloene structure in the molecule and the resin (B) are mixed, and thereafter the softener (A2) is added to and mixed with the resultant mixture.

Irrespective of the preparation method, the oxygen-absorbing resin composition of the invention has a sea/island structure where the oxygen-absorbing resin (A1) and the softener (A2) form islands and the resin (B) forms a sea, owing to the compatibility between the ingredients. The resin (B) and a resin used in place of it may be hereinafter referred to as a matrix resin.

The kneading device for preparing the oxygen-absorbing resin composition of the invention is not particularly limited, and concretely, various kneading devices are usable, for example, single-screw extruder or multi-screw extruder such as twin-screw extruder, Banbury mixer, roller, kneader, etc. The kneading temperature preferably falls within a range of from 150 to 250° C.

The oxygen-absorbing shaped article of the invention is produced by shaping the above-mentioned, oxygen-absorbing resin composition of the invention.

The oxygen-absorbing shaped article of the invention can be produced from the oxygen-absorbing resin composition of the invention according to a known shaping method.

The oxygen-absorbing shaped article of the invention may have a form of film.

Strictly, "films" and "sheets" may be differentiated by their thickness, but in the invention, the film has a concept that includes both "films" and "sheets".

The oxygen-absorbing shaped article of the invention having a form of film (hereinafter referred to as "oxygen-absorbing film") may be produced from the oxygen-absorbing resin composition of the invention according to a known method. For example, the film may be produced according to a solution-casting method that comprises dissolving the oxygen-absorbing resin composition in a solvent and then casting the solution onto a nearly flat face and drying it thereon. In addition, for example, the oxygen-absorbing resin composition may be melt-kneaded in an extruder, then extruded out through a T-die, a circular die (ring die) or the like to give a predetermined shape, thereby producing a T-die film, a blown film or the like. As the extruder, usable is a melt-kneading machine such as a single-screw extruder, a twin-screw extruder or a Banbury mixer. The T-die film may be biaxially stretched to give a biaxially stretched film. The composition may be formed into a film through inflation molding.

The oxygen-absorbing shaped article of the invention may have any other layer than the layer ("oxygen-absorbing layer") formed of the above-mentioned, oxygen-absorbing resin composition of the invention. A preferred example of the oxygen-absorbing shaped article of the type is one having a form of multilayer film, which has a layer formed of the oxygen-absorbing resin composition (hereinafter this may be referred to as "oxygen-absorbing multilayer film").

The other layer than the layer comprising the oxygen-absorbing resin composition is not particularly limited, but its examples include a gas-barrier material layer, a sealant layer, a protective layer, an adhesive layer, etc.

In the oxygen-absorbing multilayer film of the invention, the oxygen-absorbing layer absorbs outside oxygen having permeated thereinto through the gas-barrier material layer of the film. When a packaging material that comprises the oxygen-absorbing multilayer film is formed into, for example, a bag-shaped packaging container, the layer is to be a layer that has the function of absorbing the oxygen inside the packaging container via the oxygen-permeable layer (sealant layer) thereof.

The gas-barrier material layer is a layer to be provided for preventing external gas permeation. The gas-barrier material layer is to be an outer layer when the oxygen-absorbing multilayer film is formed, for example, into a bag-shaped packaging material. The oxygen permeation rate of the gas-barrier material layer is preferably as low as possible, so far as the processability and the cost allow it; and irrespective of its thickness, the layer must have an oxygen permeation rate of less than 100 cc/m$^2$·atm·day (25° C., 90% RH), more preferably at most 50 cc/m$^2$·atm·day (25° C., 90% RH).

The material to constitute the gas-barrier material layer is not particularly limited, so far as it has low gas (e.g., oxygen, water vapor) permeability, for which, for example, usable are metals, inorganic materials, resins, etc.

As the metal, generally used is aluminum having low gas permeability. The metal may be laminated on a resin film or the like as foil thereon, or a thin metal film may be formed on a resin film or the like through vapor deposition thereon.

As the inorganic material, usable is a metal oxide such as silica or alumina. One or more such metal oxides may be used either singly or as combined, and may be deposited on a resin film or the like by vapor deposition thereon.

Though not comparable to metals and inorganic materials in point of their gas-barrier properties, resins may have many choices in point of the mechanical properties, the thermal properties, the chemical resistance, the optical properties and the production methods; and because of such advantages, resins are favorably used as the gas-barrier material. The resin usable for the gas-barrier material layer in the invention is not particularly limited, and may be any one having good gas-barrier properties; and chlorine-free resins are favorable as not generating harmful gas in incineration.

Of those, preferred for use herein is a transparent vapor-deposition film produced by vapor deposition of an inorganic oxide on a resin film.

Specific examples of the resins for use for the gas-barrier material layer include polyvinyl alcohol resins such as polyvinyl alcohol and ethylene-vinyl alcohol copolymer; polyester resins such as polyethylene terephthalate and polybutylene terephthalate; polyamide resins such as MXD nylon (polymetaxylylene adipamide); vinyl halide resins such as polyvinylidene chloride; polyacrylonitrile; etc. An inorganic oxide such as aluminum oxide or silicon oxide may be vapor-deposited on the gas-barrier material layer.

These resins may be suitably selected in accordance with the object of the intended multilayer film and in consideration of the desired necessary properties thereof, for example, gas-barrier properties, mechanical properties such as strength, toughness and rigidity, as well as heat resistance, printability, transparency, adhesiveness, etc. One or more types of these resins may be used either singly or as combined.

To the resin for use for the gas-barrier material layer, optionally added are a heat stabilizer; a UV absorbent; an antioxidant; a colorant; a pigment; a neutralizing agent; a plasticizer such as phthalate or glycol ester; a filler; a surfactant; a leveling agent; a light stabilizer; a dehydrating agent such as alkaline earth metal oxide; a deodorant such as activated carbon or zeolite; a tackifier (castor oil derivatives, sorbitan higher fatty acid esters, low-molecular polybutenes); a pot life extender (acetylacetone, methanol, methyl orthoacetate, etc.); a cissing-improving agent; other resins (poly-α-olefins, etc.); etc.

If desired, an anti-blocking agent, an antifogging agent, a heat-resistant stabilizer, a weather-resistant stabilizer, a lubricant, an antistatic agent, a reinforcing agent, a flame retardant, a coupling agent, a blowing agent, a releasing agent or the like may be added to the layer.

A protective layer may be formed outside the gas-barrier material layer for imparting heat resistance etc. thereto.

The resin for use for the protective layer includes ethylene polymers such as high-density polyethylene; propylene polymers such as propylene homopolymer, propylene-ethylene random copolymer and propylene-ethylene block copolymer; polyamides such as nylon 6 and nylon 66; polyesters such as polyethylene terephthalate; etc. Of those, preferred are polyamides and polyesters.

In case where a polyester film, a polyamide film, an inorganic oxide-deposited film, a vinylidene chloride-coated film or the like is used as the gas-barrier material layer, the gas-barrier material layer of the type additionally functions as a protective layer.

In the oxygen-absorbing multilayer film of the invention, the sealant layer is a layer that has the function of melting under heat to mutually adhere to each other (heat seal) to thereby form, inside a packaging container, a space that is shielded from the outside of the packaging container, and to transmit oxygen so as to be absorbed by the oxygen-absorbing layer while preventing direct contact of the oxygen-absorbing layer with the packaged subject inside the packaging container.

Specific examples of the heat-sealable resin for use in forming the sealant layer include homopolymers of ethylene or homopolymers of α-olefin such as propylene, for example, low-density polyethylene, middle-density polyethylene, high-density polyethylene, linear low-density polyethylene, metallocene polyethylene, polypropylene, polymethylpentene and polybutene; ethylene-α-olefin copolymers, for example, ethylene-propylene copolymer; copolymers of α-olefin as a main component with vinyl acetate, acrylate·BR>A methacrylate or the like, for example, poly-α-olefin resins such as ethylene-vinyl acetate copolymer, ethylene-ethyl acrylate copolymer, ethylene-methyl methacrylate copolymer, ethylene-acrylic acid copolymer and ethylene-methacrylic acid copolymer; acid-modified poly-α-olefin resins prepared by modifying an α-olefin (co)polymer such as polyethylene or polypropylene with an unsaturated carboxylic acid such as acrylic acid, methacrylic acid, maleic acid, maleic anhydride, fumaric acid or itaconic acid; ionomer resins prepared by processing an ethylene-methacrylic acid copolymer or the like with Na ion or Zn ion; their mixtures; etc.

To the heat-sealable resin, if desired, optionally added are an antioxidant; a tackifier (hydrogenated petroleum resins, hydrogenated terpene resins, castor oil derivatives, sorbitan higher fatty acid esters, low-molecular polybutenes, etc.); an antistatic agent; a filler; a plasticizer (phthalates, glycol esters, etc.); a surfactant; a leveling agent; a heat-resistant stabilizer; a weather-resistant stabilizer; a UV absorbent; a light stabilizer; a dehydrating agent; a pot life extender (acetylacetone, methanol, methyl orthoacetate, etc.); a cissing-improving agent; an anti-blocking agent; an antifogging agent; a lubricant; a reinforcing agent; a flame retardant; a coupling agent; a blowing agent; a releasing agent; a colorant; a pigment; etc.

The antioxidant may be the same as those that may be added to the cyclized product of a conjugated diene polymer.

The anti-blocking agent includes silica, calcium carbonate, talc, zeolite, starch, etc. The anti-blocking agent may be kneaded in resin or may be adhered to the surface of resin.

The antifogging agent includes higher fatty acid glycerides such as diglycerin monolaurate, diglycerin monopalmitate, diglycerin monooleate, diglycerin dilaurate and triglycerine monooleate; polyethylene glycol higher fatty acid esters such as polyethylene glycol oleate, polyethylene glycol laurate, polyethylene glycol palmitate and polyethylene glycol stearate; polyoxyethylene higher fatty acid alkyl ethers such as polyoxyethylene lauryl ether and polyoxyethylene oleyl ether; etc.

The lubricant includes higher fatty acid amides such as stearamide, oleamide, erucamide, behenamide, ethylenebisstearamide and ethylenebisoleamide; higher fatty acid esters; wax; etc.

The antistatic agent includes glycerin esters of higher fatty acids, sorbitan acid esters, polyethylene glycol esters, etc.

The reinforcing agent includes metal fibers, glass fibers, carbon fibers, etc.

The flame retardant includes phosphates, halogenophosphates, halides, etc.

The coupling agent includes silane-based, titanate-based, chromium-based and aluminum-based coupling agents.

The colorant and the pigment include phthalocyanine-based, indigo-based, quinacridone-based, metal complex-based and other various azo dyes; basic and acidic water-soluble dyes; azo-type, anthraquinone-type or perylene-type oil-soluble dyes; titanium oxide-based, iron oxide-based, composite oxide-based and other various metal oxides; and chromate-based, sulfide-based, silicate-based, carbonate-based and other various inorganic pigments.

The blowing agent includes methylene chloride, butane, azobisisobutyronitrile, etc.

The releasing agent includes polyethylene wax, silicone oil, long-chain carboxylic acids, metal salts of long-chain carboxylic acids, etc.

The oxygen-absorbing multilayer film of the invention preferably comprises the gas-barrier material layer, the oxygen-absorbing layer and the sealant layer as laminated in this order, but may further have the outer protective layer mentioned above, and in addition, if desired, for example, an adhesive layer comprised of polyurethane may be provided between the constitutive layers, and a thermoplastic resin layer may also be provided.

The overall thickness of the oxygen-absorbing multilayer film of the invention is preferably less than 800 μm, more preferably from 50 to 400 μm. Having the overall thickness falling within the above range, the multilayer film may have excellent transparency.

The thickness of the oxygen-absorbing layer may be generally from 1 to 50 μm or so, preferably from 5 to 30 μm or so.

The thickness of the gas-barrier material layer may be generally from 5 to 50 μm or so, preferably from 10 to 50 μm or so.

The thickness of the sealant layer may be generally from 10 to 700 μm or so, preferably from 20 to 400 μm or so.

When each of the constitutive layers is too thin, then the thickness of the multilayer film may be uneven and the rigidity and the mechanical strength thereof may be insufficient. When too thick or too thin, the heat-sealable resin could not exhibit the heat sealability.

The method for producing the oxygen-absorbing multilayer film of the invention is not particularly limited. Single-layer films for the individual layers to constitute the multilayer film may be prepared and these may be laminated; or the multilayer film may be directly formed.

The single-layer films may be produced in any known method. For example, according to a solution-casting method that comprises dissolving the resin composition or the like of forming the constitutive layer in a solvent, then casting the solution onto a nearly flat face and drying it thereon, the film may be obtained. In addition, for example, the resin composition or the like of forming the constitutive layer may be melt-kneaded in an extruder, then extruded out through a T-die, a circular die (ring die) or the like to give a predetermined shape, thereby producing a T-die film and a blown film and the like. As the extruder, usable is a kneading machine such as a single-screw extruder, a twin-screw extruder or a Banbury mixer. The T-die film may be biaxially stretched to give a biaxially stretched film.

The single-layer films produced in the manner as above may be formed into a multilayer film according to an extrusion coating method, a sandwich lamination method, a dry lamination method or the like.

For producing the multilayer extrusion film, employable is a known coextrusion method; and for example, the extrusion may be attained in the same manner as above except that the same number of extruders as that of the types of the resins are used and a multilayer multi-lamination die is used.

The coextrusion method includes a coextrusion lamination method, a coextrusion film forming method, a coextrusion inflation method, etc.

One example is shown. According to a water-cooling or air-cooling inflation method, the resins to constitute respectively a gas-barrier material layer, an oxygen-absorbing layer and a sealant layer are separately heated and melted in different extruders, then extruded out through a multilayer cylindrical die at an extrusion temperature of, for example, from 190 to 210° C., and immediately quenched for solidification with a liquid coolant such as cooling water, thereby giving a tubular resin laminate.

In producing the multilayer film, the temperature of the ingredients to constitute the film layers such as the oxygen-absorbing resin composition and others is preferably from 160 to 250° C. When it is lower than 160° C., the layer thickness may be uneven and the film may be cut; but when higher than 250° C., the film may also be cut. More preferably, the temperature is from 170 to 230° C.

The film take-up speed in producing the multilayer film may be generally from 2 to 200 m/min, preferably from 50 to 100 m/min. When the take-up speed is too low, then the production efficiency may be poor; but when it is too high, then the film could not be sufficiently cooled and may be fused during taking up.

In case where the gas-barrier material layer film comprises a stretchable material and in case where its properties could be enhanced by stretching, as in the case of polyamide resin, polyester resin, polypropylene and the like, then the multilayer film obtained through coextrusion may be further uniaxially or biaxially stretched. If desired, it may be further heat-set.

The draw ratio in stretching is not particularly limited and may be generally from 1 to 5 times in both the machine direction (MD) and the transverse direction (TD), preferably from 2.5 to 4.5 times in both MD and TD.

The stretching may be attained in a known method of tenter stretching, inflation stretching, roll stretching or the like. The stretching may be attained in any order of MD stretching or TD stretching; however, it is preferably attained at the same time for MD and TD stretching. A tubular simultaneous biaxial stretching method may be employed.

The gas-barrier material layer film may be subjected to front surface printing or rear surface printing or the like with a desired printing pattern, for example, letters, figures, symbols, designs, patterns and the like by an ordinary printing method.

The shape of the oxygen-absorbing multilayer film of the invention is not particularly limited, and the film may be any of a flat film, an embossed film or the like.

The oxygen-absorbing multilayer film of the invention is useful as a packaging material.

The packaging material comprised of the oxygen-absorbing multilayer film of the invention can be shaped into various forms of packaging containers and used.

Regarding the forms of the packaging containers obtainable from the packaging material of the invention, there may be mentioned casings, bags, etc. Regarding the forms of the packaging materials obtainable from the multilayer film of the invention, there may be mentioned ordinary, three-sidesealed or four-side-sealed pouches, gusseted pouches, standing pouches, pillow packaging bags, etc. In case where the oxygen-absorbing multilayer film is a flat film, it may be formed into a packaging material having a desired shape according to an ordinary method; and in case where the film is in the form of a tubular laminate, it may be formed into a casing or a bag directly as it is.

The packaging material of the invention may be reheated at a temperature not higher than the melting point of the resins constituting it, and then uniaxially or biaxially stretched according to a thermoforming method of, for example, drawing, or according to a roll stretching method, a pantographic stretching method, an inflation stretching method or the like, thereby giving a stretched article.

The packaging container obtained from the packaging material comprised of the oxygen-absorbing shaped article of the invention is effective for preventing the contents therein from being deteriorated by oxygen and for prolonging the shelf life thereof. The contents to be filled in the container are, for example, foods such as rice cakes, ramen, fruits, nuts, vegetables, meat products, baby foods, coffee, edible oil, sauces, shellfishes boiled in sweetened soy sauce, milk products, Japanese and western-style sweets; drugs; cosmetics; electronic materials; medical equipment materials; packaging materials for silver or iron parts; chemicals such as adhesives and sticking agents; miscellaneous goods such as chemical body warmers; etc.

EXAMPLES

The invention is described more concretely with reference to the following Production Examples and Examples. Unless otherwise specifically indicated, part and % in all Examples are by weight.

The properties of the samples were evaluated according to the following methods.

[Weight-average Molecular Weight (Mw) of Cyclized Product of Conjugated Diene Polymer]

This is determined as a molecular weight in terms of polystyrene by gel permeation chromatography.

[Unsaturated Bond Reduction Ratio of Cyclized Product of Conjugated Diene Polymer]

This is determined by proton NMR analysis with reference to the methods described in the following references (i) and (ii).

(i) M. A. Golub and J. Heller. Can., J. Chem., Vol. 41, p. 937 (1963).

(ii) Y. Tanaka and H. Sato, J. Polym. Sci.: Poly. Chem. Ed., Vol. 17, p. 3027 (1979).

In the conjugated diene monomer unit segment in a conjugated diene polymer, when the overall proton peak area before cyclization is represented by SBT, the peak area of the protons directly bonding to the double bond before cyclization is represented by SBU, the overall proton peak area after cyclization is represented by SAT and the peak area of the protons directly bonding after cyclization to the double bond is represented by SAU, then the peak area ratio (SB) of the protons directly bonding to the double bond before cyclization is:

$$SB = SBU/SBT,$$

and the peak area ratio (SA) of the protons directly bonding to the double bond after cyclization is:

$$SA = SAU/SAT.$$

Accordingly, the unsaturated bond reduction ratio is determined according to the following expression:

$$\text{Unsaturated bond reduction ratio}(\%) = 100 \times (SB - SA)/SB.$$

[Glass Transition Temperature]

Using a differential scanning calorimeter (Seiko Instruments' trade name, "EXSTR6000 DSC"), this is determined in a nitrogen flow at a heating speed of 10° C./min.

[Formation of Oxygen-absorbing Film]

A T-die and a biaxial stretch machine (both by Toyo Seiki Seisakusho) were connected to a laboratory plastomill single-screw extruder, and pellets of an oxygen-absorbing resin composition are extruded and shaped into a film having a width of 100 mm and a thickness of 20 µm.

[Oxygen Absorption Rate (cc/100 cm$^2$·Day) of Oxygen-absorbing Film]

An oxygen-absorbing film having a thickness of 20 µm is cut into a size of 100 mm×100 mm, and put into an aluminum pouch having a size of 300 mm×400 mm (Sakura Bussan's trade name "Hiretort Alumi ALH-9"), then air inside it is completely removed, and 200 cc of air having an oxygen concentration of 20.7% is sealed up therein, and stored at 25° C. for 10 days with both surfaces of the oxygen-absorbing film kept in contact with air, and then the oxygen concentration inside the pouch is measured with an oxygen densitometer (US Ceramatic's trade name "Food Checker HS-750"). From the thus-measured oxygen concentration and the oxygen concentration, 20.7%, before the start of the test, the oxygen absorption rate (cc/100 cm$^2$·day) is computed. Samples having a larger value measured in the manner are more excellent in the oxygen absorbability.

[Smell Level After Oxygen Absorption]

An oxygen-absorbing film having a thickness of 20 µm is cut into a size of 100 mm×100 mm, and put into an aluminum pouch having a size of 300 mm×400 mm (Sakura Bussan's trade name "Hiretort Alumi ALH-9"), then air inside it is completely removed, and 200 cc of air having an oxygen concentration of 20.7% is sealed up therein, and stored at 60° C. for 12 days with both surfaces of the oxygen-absorbing film kept in contact with air, and then the smell level in the pouch is determined. According to the following criteria, 10 panelists smell and evaluate it, and their points are averaged to be a smell level.

Point 1: No smell at all.
Point 2: Only slight smells.
Point 3: Some but a few acid smells.
Point 4: strong acid smells.
Point 5: Very strong acid smells.

[Oxygen Absorbability of Oxygen-absorbing Multilayer Film]

A polyethylene (MFR (melt flow rate)=2.1, Nippon Polyethylene's trade name, "Novatec LL UF641") is formed into an unstretched polypropylene film having a thickness of 30 µm. An ethylene/vinyl alcohol copolymer (MFR=5.5, ethylene ratio 44 mol %, Kuraray's trade name, "Eval E105B") is formed into a gas-barrier material layer film having a thickness of 20 µm.

These films are layered in an order of unstretched polyethylene film/oxygen-absorbing resin composition film/gas-barrier material layer film, and laminated, using a hot roll laminator (Gmp's trade name, "EXCELAM II 355Q") set at 150° C.

The obtained laminate film is cut into a size having a length of 400 mm and a width of 100 mm and folded in two in such a manner that the sealant layer could face inside, and its two sides are heat-sealed to form a bag having a size of 200 mm×100 mm. 100 cc of air having an oxygen concentration of 20.7% is put into the bag and sealed up therein by heat-sealing the remaining sides of the bag.

This is left at 25° C. for 10 days, and then the oxygen concentration in the bag is measured with an oxygen densitometer (US Ceramatic's trade name "Food Checker HS-750"). In addition, the smell level in the bag is also determined.

In the bags having a lower oxygen concentration after left for 10 days, the oxygen-absorbing multilayer film has better oxygen absorbability.

[Haze Value]

According to JIS K7105, film samples are tested at a temperature of 23±2° C. using Haze Guard II (by Toyo Seiki). Three samples of one film are tested and the data are averaged (n=3).

Production Example 1

Production of Cyclized Product (D1) of Conjugated Diene Polymer 300 parts of polyisoprene (cis-1,4-unit content, 73%; trans-1,4-unit content, 22%; 3,4-unit content, 5%; weight-average molecular weight, 154,000) cut into 10 mm square pieces were put into a pressure reactor equipped with a stirrer, a thermometer, a reflux condenser and a nitrogen gas inlet tube, along with 700 parts of cyclohexane thereinto. The reactor was purged with nitrogen. The contents were heated at 75° C., and with stirring, polyisoprene was completely dissolved in cyclohexane, and thereafter 2.7 parts of p-toluenesulfonic acid (dehydrated under reflux in toluene so as to have a water content of at most 150 ppm) was put into it to attain cyclization at a temperature not higher than 80° C. After thus reacted for 7 hours, aqueous 25% sodium carbonate solution containing 1.044 parts of sodium carbonate was put into it to stop the reaction. Then at 80° C., water was removed by azeotropic refluxing dehydration, and thereafter the catalyst residue was removed from the reaction liquid through a glass fiber filter having a pore size of 2 μm.

To the solution of the obtained, cyclized product of the conjugated diene polymer, added was an antioxidant, 2,2'-methylenebis(4,6-di-t-butylphenyl)octyl phosphite (Asahi Denka's trade name "HP-10") in an amount corresponding to 2,000 ppm relative to the cyclized product of the conjugated diene polymer; then cyclohexane in the solution was evaporated away, and toluene was removed by vacuum drying, thereby giving a solid cyclized product (D1) of the conjugated diene polymer. The unsaturated bond reduction ratio of the cyclized product (D1) of the conjugated diene polymer was 64.7%, the weight-average molecular weight thereof was 122,000, and the glass transition temperature thereof was 61° C.

The obtained, cyclized product (D1) of the conjugated diene polymer was pelletized into round pellets (a1), using a single-screw kneading extruder (die φ 3 mm×one hole).

The kneading machine used herein was Ikegai's single-screw kneading extruder (40 φ, L/D=25), and the kneading condition was as follows: Cylinder 1 was 140° C., cylinder 2 was 150° C., cylinder 3 was 160° C., cylinder 4 was 170° C., die was 170° C., and the screw revolution speed was 25 rpm.

Production Example 2

Production of Cyclized Product (D2) of Conjugated Diene Polymer 8,000 parts of cyclohexane, 320 parts of styrene and 19.9 mmol of n-butyllithium (solution in hexane, having a concentration of 1.56 mol/liter) were fed into an autoclave equipped with a stirrer, then heated to have an inner temperature of 60° C., and polymerized for 30 minutes. The conversion of styrene in polymerization was about 100%. A part of the polymerization solution was sampled, and analyzed for the weight-average molecular weight of the obtained polystyrene, which was 14,800.

Next, with controlling the inner temperature so as not to be higher than 75° C., 1,840 parts of isoprene was continuously added to it, taking 60 minutes. After the addition, this was further reacted at 70° C. for 1 hour. At this point, the conversion in polymerization was about 100%.

To the polymerization solution, added was 0.362 part of an aqueous 1% solution of β-naphthalenesulfonic acid/formalin condensate sodium salt to stop the polymerization. Next, cyclohexane was removed, and a diblock-structured block copolymer comprising a polystyrene block and a polyisoprene block was obtained. A part of this was sampled, and analyzed for the weight-average molecular weight thereof, which was 178,000.

300 parts of the block copolymer was dissolved in 900 parts of cyclohexane, and 3.78 parts of p-toluenesulfonic acid (dehydrated under reflux in toluene to have a water content of at most 150 ppm) was put into it to attain cyclization with controlling the temperature so as not to be higher than 80° C. Next, aqueous 25% sodium carbonate solution containing 2.33 parts of sodium carbonate was added thereto to stop the cyclization, and this was further kept stirred for 30 minutes at 80° C. The solution of the obtained, cyclized product of the conjugated diene polymer was filtered through a glass fiber filter having a pore size of 1 μm to remove the cyclization catalyst residue, thereby giving a solution containing the cyclized product of the conjugated diene polymer.

An antioxidant, 2,2'-methylenebis(4,6-di-t-butylphenyl) octyl phosphite (Asahi Denka's trade name "HP-10") was added thereto in an amount corresponding to 2,000 ppm relative to the cyclized product of the conjugated diene polymer; then cyclohexane in the solution was evaporated away, and toluene was removed by vacuum drying, thereby giving a solid cyclized product (D2) of the conjugated diene polymer.

The unsaturated bond reduction ratio of the cyclized product (D2) of the conjugated diene polymer was 65.8%, the weight-average molecular weight thereof was 145,000, and the glass transition temperature of the cyclized polyisoprene moiety thereof was 62° C.

The obtained, cyclized product (D2) of the conjugated diene polymer was pelletized into round pellets (a2), using a single-screw kneading extruder (die φ 3 mm×one hole).

Examples 1 to 4

[Production of Oxygen-absorbing Resin Composition Pellets]

The pellets (a1) of the cyclized product (D1) of conjugated diene polymer or the pellets (a2) of the cyclized product (D2) of conjugated diene polymer, and liquid paraffin (Kaneda's trade name "Hicall K-350", viscosity 74.0 to 88.0 mm²/s (37.8° C.)), and a copolyester PET-G (SKYGREEN's trade name "PETG S2008") having an oxygen permeability of 280 cc 20 μm/m²·day·atm (25° C., 65% RH) or nylon 6 (Mitsubishi Engineering Plastics' trade name "Novamid 1030") having an oxygen permeability of 180 cc 20 μm/m²·day·atm (25° C., 65% RH) were kneaded in a blend ratio shown in Table 1, using a twin-screw kneading extruder (Berstroff's trade name, "ZE40A", 43φ, L/D=33.5) under the kneading condition of cylinder 1: 165° C., cylinder 2: 185° C., cylinder 3: 195° C., cylinder 4: 190° C., die temperature; 190° C., and screw revolution speed: 25 rpm, thereby giving oxygen-absorbing resin composition pellets P1 to P4.

The constitutions of these pellets are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Cycloene structure-having resin (A1) | | | | | | | |
| Cyclized product (D1) of conjugated diene polymer (part) | 20.5 | 24.6 | 0 | 0 | 24.6 | 24.6 | 0 |
| Cyclized product (D2) of conjugated diene polymer (part) | 0 | 0 | 36.2 | 20.8 | 0 | 0 | 84.7 |
| Softener (A2) | | | | | | | |
| Liquid paraffin (part) | 4.5 | 5.4 | 3.8 | 4.2 | 4.4 | 4.4 | 15.3 |
| Resin composition (A) | | | | | | | |
| Glass transition temperature (° C.) | 15 | 15 | 15 | 10 | 15 | 15 | 15 |
| Matrix resin (B) | | | | | | | |
| Copolyester (part) | 75 | 70 | 0 | 0 | 0 | 0 | 0 |
| Nylon 6 (part) | 0 | 0 | 70 | 75 | 0 | 0 | 0 |
| Polypropylene (part) | 0 | 0 | 0 | 0 | 70 | 0 | 0 |
| Ethylene/vinyl alcohol copolymer (part) | 0 | 0 | 0 | 0 | 0 | 70 | 0 |
| Pellets | P1 | P2 | P3 | P4 | PC1 | PC2 | PC3 |

Examples 5 to 8

The oxygen-absorbing resin composition pellets P1 to P4 produced in Examples 1 to 4 were used. A T-die and a film take-up device (both by Toyo Seiki Seisakusho) were connected to a laboratory plastomill single-screw extruder, through which the pellets were formed into films F1 to F4 having a width of 120 mm and a thickness of 20 μm by extrusion.

These films F1 to F4 were tested for the haze value thereof. The films were cut into a size of 100 mm×100 mm, and put into an aluminum pouch, ALH-9 having a size of 300 mm×400 mm, then air inside it was completely removed, and 200 cc of air was introduced thereinto. After this was stored at 60° C. for 12 days, the smell was determined; and after stored at 25° C. (65% RH) for 10 days, the oxygen absorption rate (cc/100 cm²·day) was computed from the oxygen absorption amount (cc/100 cm²). The results are shown in Table 2.

TABLE 2

|  | Example | | | | Comparative Example | | |
| --- | --- | --- | --- | --- | --- | --- | --- |
|  | 5 | 6 | 7 | 8 | 4 | 5 | 6 |
| Pellets | P1 | P2 | P3 | P4 | PC1 | PC2 | PC3 |
| Film | F1 | F2 | F3 | F4 | FC1 | FC2 | FC3 |
| Haze (%) | 8.6 | 16.5 | 23.2 | 9.5 | 5.6 | 5.8 | 4.2 |
| Oxygen Absorption Rate (cc/100 cm²·day) | 2.5 | 2.1 | 2.3 | 2.8 | 3.1 | 0.0 | 3.4 |
| Smell | 1.3 | 1.5 | 1.2 | 1.1 | 3.5 | 1.7 | 4.5 |

Comparative Examples 1 to 3

Oxygen-absorbing resin composition pellets PC1 and PC2 were produced in the same manner as in Examples, for which, however, polypropylene (MFR=6, Idemitsu Kosan's trade name "J-734NP") having an oxygen permeability of 6,800 cc 20 μm/m²·day·atm (25° C., 65% RH) or ethylene/vinyl alcohol copolymer (Kuraray's trade name "E-105B") having an oxygen permeability of 3.4 cc 20 μm/m²·day·atm (25° C., 65% RH) was used in place of the copolyester and the polyamide resin. Pellets PC3 were produced, not using a matrix resin.

The constitutions of these pellets are shown in Table 1.

Comparative Examples 4 to 6

Films were formed through extrusion in the same manner as in Examples, for which, however, the pellets PC1 to PC3 were used in place of P1 to P4. Like in Examples, the films were analyzed for the smell and the oxygen absorption amount.

The results are shown in Table 2.

From the results in Table 1 and Table 2, it is shown that the oxygen-absorbing films obtained from the oxygen-absorbing resin compositions of the invention, comprising a resin composition (A) that comprises an oxygen-absorbing resin (A1) having a cycloene structure in the molecule and a softener (A2) and has a glass transition temperature of from −30° C. to +30° C., as dispersed in a resin (B) having an oxygen permeability of from 100 cc to 500 cc 20 μm/m²·day·atm (25° C., 65% RH), exhibit excellent oxygen absorbability at 25° C. and release little smell on oxygen absorption (Examples 5 to 8).

As opposed to these, it is shown that, when a resin of which the oxygen permeability oversteps the range defined in the invention is used as a matrix resin or when a matrix resin is not used, then the oxygen absorption by the films is low and the films release much smell on oxygen absorption (Comparative Examples 4 to 6).

Examples 9 to 10, Comparative Example 7

The oxygen-absorbing films F1 and F3 produced in Examples 5 and 7 and the oxygen-absorbing film FC1 produced in Comparative Example 4 were used. Multilayer films were produced through lamination of unstretched polyethylene film/oxygen-absorbing resin composition film/gas-barrier material layer film, and heat-sealed to form oxygen-absorbing multilayer bags. The bags were tested for the oxygen concentration and the smell after 10 days. The results are shown in Table 3.

TABLE 3

|  | Example | | Comparative |
|---|---|---|---|
|  | 9 | 10 | Example 7 |
| Film | F1 | F3 | FC1 |
| Oxygen concentration (%) after 10 days | 0.5 | 0.3 | 0.8 |
| Smell | 1.3 | 1.5 | 3.8 |

From the results in Table 3, it is shown that the multilayer films having an oxygen-absorbing layer formed of the oxygen-absorbing resin composition of the invention, comprising a resin composition (A) that comprises an oxygen-absorbing resin (A1) having a cycloene structure in the molecule and a softener (A2) and has a glass transition temperature of from −30° C. to +30° C., as dispersed in a resin (B) having an oxygen permeability of from 100 cc to 500 cc 20 μm/m²·day·atm (25° C., 65% RH), exhibit excellent oxygen absorbability at 25° C. and release little smell on oxygen absorption (Examples 9 to 10).

As opposed to these, it is shown that, when a resin of which the oxygen permeability oversteps the range defined in the invention is used as a matrix resin, then the oxygen absorption by the film is low and the film releases much smell on oxygen absorption (Comparative Example 7).

The invention claimed is:

1. An oxygen-absorbing resin composition, comprising:
 a resin composition (A) that comprises an oxygen-absorbing resin (A1) that is a cyclized product of a conjugated diene polymer and a softener (A2);
 wherein the resin composition (A) is dispersed in a resin (B);
 wherein the resin composition (A) has a glass transition temperature of from −30° C. to +30° C.;
 wherein the softener (A2) is a fluid being compatible with the oxygen-absorbing resin (A1) and having a glass transition temperature or a pour point of from −150° C. to −30° C.; and
 wherein the resin (B) is a terephthalic acid/cyclohexanedimethanol-based copolymer or a polyamide resin and the resin (B) has an oxygen permeability of from 100 cc to 500 cc 20 μm/m²·day·atm (25° C., 65% RH).

2. The oxygen-absorbing resin composition as claimed in claim 1, wherein the cyclized product of a conjugated diene polymer has an unsaturated bond reduction ratio of from 60% to 80% as is determined according to the following equation:

[Unsaturated bond reduction ratio (%)]=100×$(SB-SA)/SB$, wherein SB is a peak area ratio of the protons directly bonding to the double bond before the cyclization reaction determined by "SB =SBU/SBT"; SA is a peak area ratio of protons directly bonding to the double bond after the cyclization reaction determined by "SA=SAU/SAT"; SBT and SBU are an overall proton peak area before the cyclization reaction and a peak area of the protons directly bonding to the double bond before the cyclization reaction, respectively; and SAT and SAU are an overall proton peak area after the cyclization reaction and a peak area of the protons directly bonding to the double bond after the cyclization reaction, respectively, in the conjugated diene monomer unit segment in the conjugated diene polymer, where the peak area of protons is determined through proton NMR analysis.

3. The oxygen-absorbing resin composition as claimed in claim 2, wherein the softener (A2) is liquid paraffin or polybutene.

4. An oxygen-absorbing shaped article produced by shaping the oxygen-absorbing resin composition of claim 2.

5. An oxygen-absorbing shaped article having a layer formed of the oxygen-absorbing resin composition of claim 2.

6. The oxygen-absorbing resin composition as claimed in claim 1, wherein the softener (A2) is liquid paraffin or polybutene.

7. An oxygen-absorbing shaped article produced by shaping the oxygen-absorbing resin composition of claim 6.

8. An oxygen-absorbing shaped article having a layer formed of the oxygen-absorbing resin composition of claim 6.

9. An oxygen-absorbing shaped article produced by shaping the oxygen-absorbing resin composition of claim 1.

10. The oxygen-absorbing shaped article as claimed in claim 9, which has a form of film.

11. An oxygen-absorbing packaging material comprised of the oxygen-absorbing shaped article of claim 10.

12. An oxygen-absorbing packaging material comprised of the oxygen-absorbing shaped article of claim 9.

13. An oxygen-absorbing packaging container comprised of the packaging material of claim 12.

14. An oxygen-absorbing shaped article having a layer formed of the oxygen-absorbing resin composition of claim 1.

15. The oxygen-absorbing shaped article as claimed in claim 14, which has a form of multilayer film.

* * * * *